United States Patent

Ballard et al.

[11] Patent Number: 5,829,236
[45] Date of Patent: Nov. 3, 1998

[54] GRASS TRIMMER WHEELED CARRIER

[76] Inventors: Jonathan D. Ballard; Sally L. Ballard, both of 35585 Washington Spring Rd., Glade Spring, Va. 24340

[21] Appl. No.: 842,912

[22] Filed: Apr. 17, 1997

[51] Int. Cl.$^6$ .............................. A01D 53/00; A01D 34/43
[52] U.S. Cl. .............................. 56/16.7; 56/12.7; 172/13
[58] Field of Search .............................. 30/276; 56/12.1, 56/12.7, 16.7, 16.9, 17.2, 17.5; 172/14, 15, 13

[56] References Cited

U.S. PATENT DOCUMENTS

| | | | |
|---|---|---|---|
| 4,182,100 | 1/1980 | Letter | 56/16.7 |
| 4,531,350 | 7/1985 | Huthmacher | 56/17.5 |
| 4,829,755 | 5/1989 | Nance | 56/17.1 |
| 4,936,886 | 6/1990 | Quillen | 56/16.7 |
| 5,626,006 | 5/1997 | Fricke, Sr. | 56/12.7 |

*Primary Examiner*—Michael J. Carone
*Assistant Examiner*—Robert Pezzuto

[57] ABSTRACT

A new grass trimmer wheeled carrier for supporting a grass trimmer with an grass cutting rotating head at the end of its elongate shaft portion. The inventive device includes a support frame having ground engaging wheels, a handle member coupled to the support frame to allow a user to maneuver the rotating head of a mowing device over the ground, and a pair of mounting members adapted for holding a mowing device are also coupled to the support frame. One of the mounting member is adapted for holding the rotating head of a mowing device in a fixed position in relation to the support frame. A trigger member is pivotally mounted on the handle member and is attached to the switch means of a grass trimmer to allow a user to engage the switch means to selectively rotate the rotating head of the mounted grass trimmer.

7 Claims, 2 Drawing Sheets

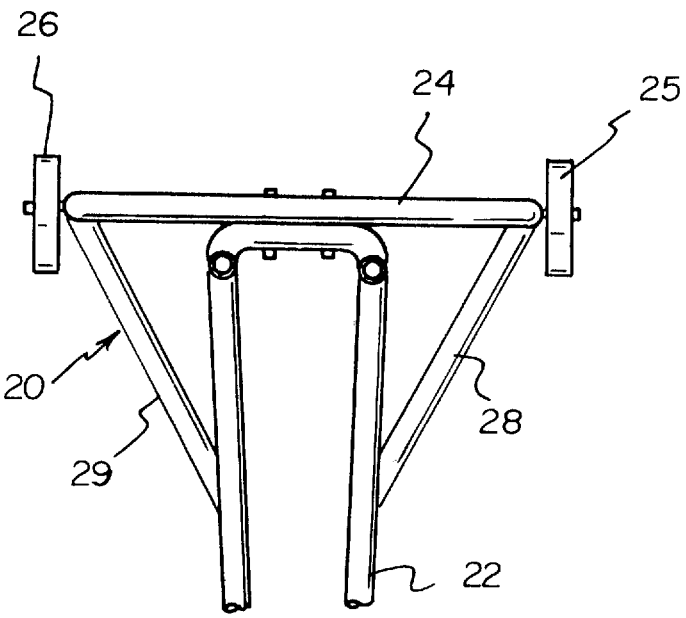
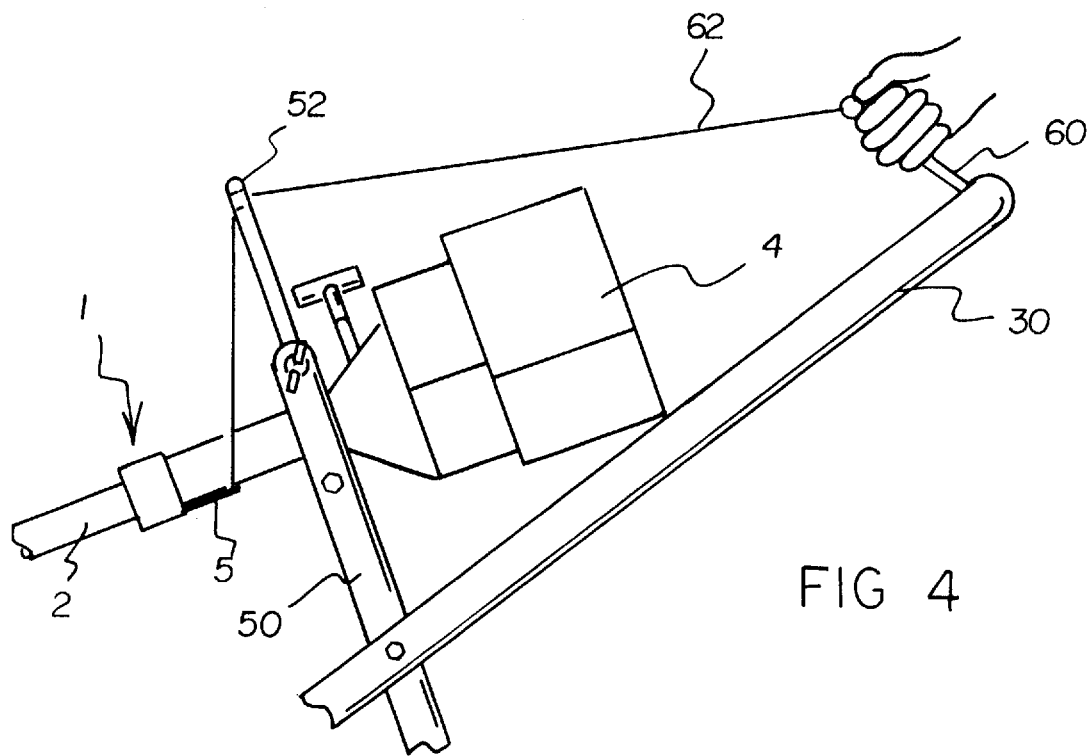

GRASS TRIMMER WHEELED CARRIER

BACKGROUND OF THE INVENTION

1. Field of the Invention

The present invention relates to wheeled supports for equipment and more particularly pertains to a new grass trimmer wheeled carrier for supporting a grass trimmer with an grass cutting rotating head at the end of its elongate shaft portion.

2. Description of the Prior Art

The use of wheeled supports for equipment is known in the prior art. More specifically, wheeled supports for equipment heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheeled supports for equipment include U.S. Pat. No. 4,182,100; U.S. Pat. No. 5,092,112; U.S. Pat. No. 4,704,849; U.S. Pat. No. 4,531,350; U.S. Pat. No. 4,688,376; and U.S. Pat. No. 4,442,659.

While these devices fulfill their respective, particular objectives and requirements, the aforementioned patents do not disclose a new grass trimmer wheeled carrier. The inventive device includes a support frame having ground engaging wheels, a handle member coupled to the support frame to allow a user to maneuver the rotating head of a mowing device over the ground, and a pair of mounting members adapted for holding a mowing device are also coupled to the support frame. One of the mounting member is adapted for holding the rotating head of a mowing device in a fixed position in relation to the support frame. A trigger member is pivotally mounted on the handle member and is attached to the switch means of a grass trimmer to allow a user to engage the switch means to selectively rotate the rotating head of the mounted grass trimmer.

In these respects, the grass trimmer wheeled carrier according to the present invention substantially departs from the conventional concepts and designs of the prior art, and in so doing provides an apparatus primarily developed for the purpose of supporting a grass trimmer with an grass cutting rotating head at the end of its elongate shaft portion.

SUMMARY OF THE INVENTION

In view of the foregoing disadvantages inherent in the known types of wheeled supports for equipment now present in the prior art, the present invention provides a new grass trimmer wheeled carrier construction wherein the same can be utilized for supporting a grass trimmer with an grass cutting rotating head at the end of its elongate shaft portion.

The general purpose of the present invention, which will be described subsequently in greater detail, is to provide a new grass trimmer wheeled carrier apparatus and method which has many of the advantages of the wheeled supports for equipment mentioned heretofore and many novel features that result in a new grass trimmer wheeled carrier which is not anticipated, rendered obvious, suggested, or even implied by any of the prior art wheeled supports for equipment, either alone or in any combination thereof.

To attain this, the present invention generally comprises a support frame having ground engaging wheels, a handle member coupled to the support frame to allow a user to maneuver the rotating head of a mowing device over the ground, and a pair of mounting members adapted for holding a mowing device are also coupled to the support frame. One of the mounting member is adapted for holding the rotating head of a mowing device in a fixed position in relation to the support frame. A trigger member is pivotally mounted on the handle member and is attached to the switch means of a grass trimmer to allow a user to engage the switch means to selectively rotate the rotating head of the mounted grass trimmer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grass trimmer wheeled carrier apparatus and method which has many of the advantages of the wheeled supports for equipment mentioned heretofore and many novel features that result in a new grass trimmer wheeled carrier which is not anticipated, rendered obvious, suggested, or even implied by any of the prior art wheeled supports for equipment, either alone or in any combination thereof.

It is another object of the present invention to provide a new grass trimmer wheeled carrier which may be easily and efficiently manufactured and marketed.

It is a further object of the present invention to provide a new grass trimmer wheeled carrier which is of a durable and reliable construction.

An even further object of the present invention is to provide a new grass trimmer wheeled carrier which is susceptible of a low cost of manufacture with regard to both materials and labor, and which accordingly is then susceptible of low prices of sale to the consuming public, thereby making such grass trimmer wheeled carrier economically available to the buying public.

Still yet another object of the present invention is to provide a new grass trimmer wheeled carrier which provides in the apparatuses and methods of the prior art some of the advantages thereof, while simultaneously overcoming some of the disadvantages normally associated therewith.

Still another object of the present invention is to provide a new grass trimmer wheeled carrier for supporting a grass trimmer with an grass cutting rotating head at the end of its elongate shaft portion.

Yet another object of the present invention is to provide a new grass trimmer wheeled carrier which includes a support frame having ground engaging wheels, a handle member coupled to the support frame to allow a user to maneuver the rotating head of a mowing device over the ground, and a pair of mounting members adapted for holding a mowing device are also coupled to the support frame. One of the mounting member is adapted for holding the rotating head of a mowing device in a fixed position in relation to the support frame. A trigger member is pivotally mounted on the handle member and is attached to the switch means of a grass trimmer to allow a user to engage the switch means to selectively rotate the rotating head of the mounted grass trimmer.

Still yet another object of the present invention is to provide a new grass trimmer wheeled carrier that helps reduce back strain arising from users using heavy carrying-type mowing devices such as gas powered grass trimmers.

Even still another object of the present invention is to provide a new grass trimmer wheeled carrier that permits easy maneuvering of a grass trimmer around obstacles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional top view taken from the view of line 3—3 on FIG. 1.

FIG. 4 is a sectional side view of the trigger member in the position to engage the switching means of the grass trimmer.

DESCRIPTION OF THE PREFERRED EMBODIMENT

Figure 1:
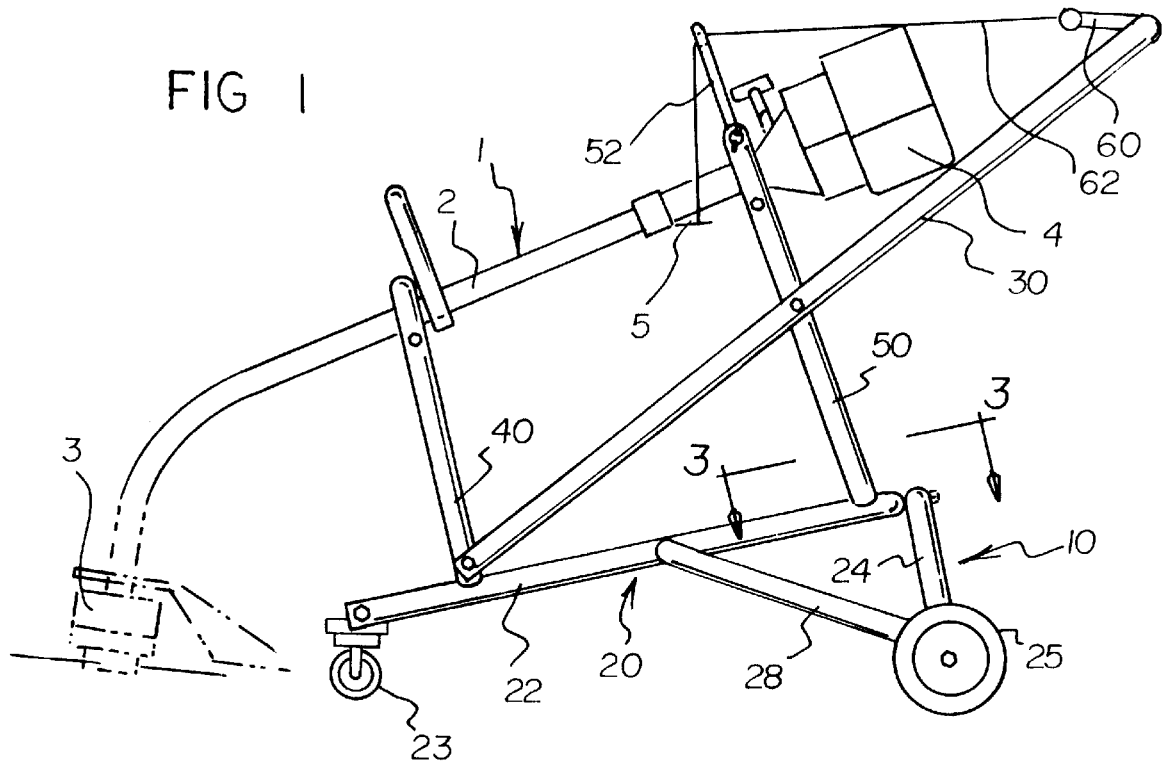
FIG. 1 is a side view of a new grass trimmer wheeled carrier carrying a grass trimmer according to the present invention.
Figure 2:
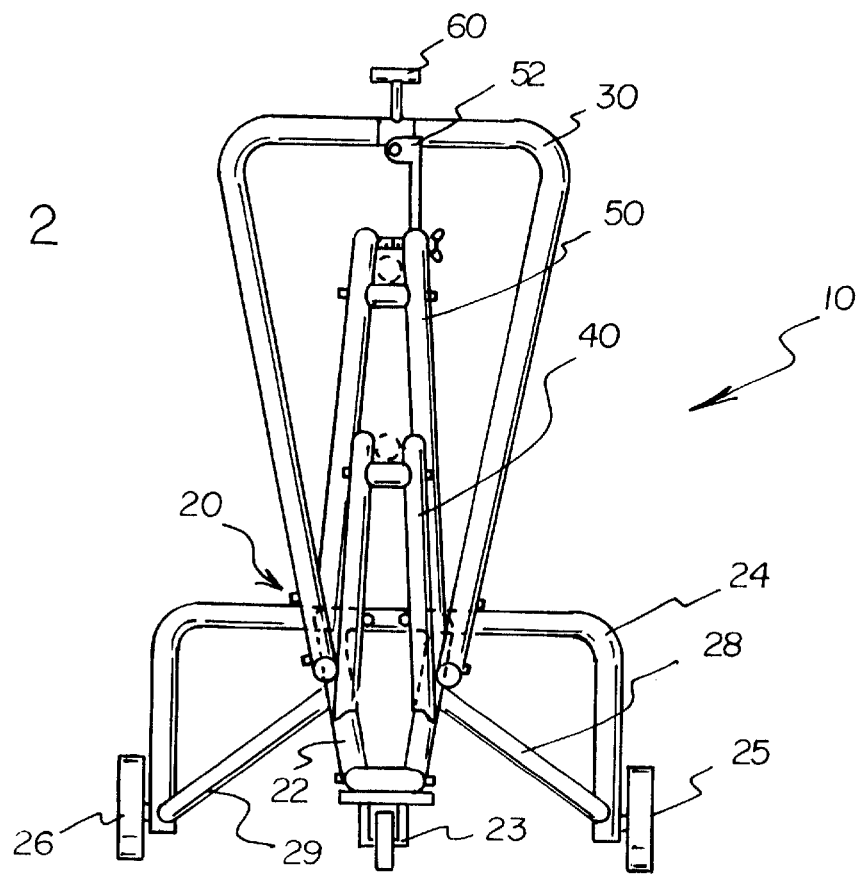
FIG. 2 is a front plan view of the present invention.

With reference now to the drawings, and in particular to FIGS. 1 through 4 thereof, a new grass trimmer wheeled carrier embodying the principles and concepts of the present invention and generally designated by the reference numeral 10 will be described.

As best illustrated in FIGS. 1 through 4, the grass trimmer wheeled carrier 10 comprises a support frame 20, a handle member 30, a first mounting member 40, a second mounting member 50, and a trigger member 60.

In use, the grass trimmer wheeled carrier 10 is designed to a mowing device or grass trimmer 1 with an elongated shaft portion 2 with a grass cutting rotating head 3 at one end and a power means 4 for rotating the rotating head 3 at its other end. Commonly, the power means 4 includes a switch means 5 to permit selective engagement of the power means 4 to the rotating head 3.

Preferably, the support frame 20 is comprises a main support frame 22 with an attached rear support frame 24 both having ground engaging wheels 23,25,26. Ideally, the front wheel 23 is pivotable to allow easier turning of the grass trimmer wheeled carrier 10 when pushed or pulled. For added strength and support, the support frame 20 also includes a pair of support braces 28,29 extending between the rear support frame 24 and the main support frame 22. The support braces 28,29 help prevent the rear support frame 24 and the main support frame from spreading apart when a mowing device is attached to the grass trimmer wheeled carrier 10.

The handle member 30 is coupled to the main support frame 22. The handle member 30 is shaped to allow a user to maneuver the rotating head 3 of the mounted mowing device 1 over the ground by pushing or pulling the handle member 30.

The first mounting member 40 and a second mounting member 50 provide a means for mounting a mowing device 1 on the support frame 20 Preferably, the mounting members 40,50 are attached to the main support frame 22 and the handle member 30 and are both adapted for holding the shaft 2 a mowing device 1. The first mounting member 40 is adapted so that it holds the rotating head 3 of a mowing device 1 in a fixed position in relation to the support frame 20. As shown in FIG. 1, the first mounting member 40 positions the rotating head 3 towards the front end of the main support frame 22 adjacent the surface of the ground so that the rotating head 3 may be used to cut grass when the mowing device 1 is mounted on the invention 10.

The trigger member 60 is pivotally mounted on the handle member 30 and includes a trigger wire 62 that extends through a wire guide 52 on the second mounting member 50 and attached to the switch means of the mowing device 1. The trigger member 60 provides a means for permitting a user to conveniently engage the switch means 5 of a mowing device 1 while operating the invention 10. The trigger member 60 allows a user to engage the switch means 5 without having to awkwardly reach for the switch means 5. Preferably, the trigger member and the trigger wire should be attached to the switch means 3 so that the switch means 5 is initially in the position to disengage the power means 4 from the rotating head 3. When the trigger wire 62 is pulled by the trigger member 60, the wire 62 pulls the switch means 5 to engage the power means 4 to the rotating head 3.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grass trimmer wheeled carrier for supporting a grass trimmer device having an elongated shaft with a grass cutting head including a rotating head at one end and having a power means for rotating said rotating head, said power means having a switch means for selectively rotating said rotating head, said grass trimmer wheeled carrier comprising:

a support frame having ground engaging wheels, one wheel being mounted in a forward position on said support frame and another wheel being mounted in a rearward position on said support frame;

a handle member being coupled to said support frame, said handle member being adapted for allowing a user to maneuver the rotating head of the grass trimmer device over the ground;

a mounting means for mounting the grass trimmer device on said support frame whereby the rotating head of the grass trimmer device is positioned adjacent the surface of the ground, wherein said mounting means includes a first mounting member and a second mounting member, said first mounting member and said second mounting member each being coupled to said support frame, said first mounting member and said second mounting member being adapted for attachment to the grass trimmer device at spaced locations on said elongated shaft, said first and second mounting members being located between said one wheel and said another wheel to enhance stable mounting of said grass trimmer device on said support frame;

a switch engaging means for permitting the user to engage the switch means of the grass trimmer device while the user's hands are engaging said handle member such that the switch means of the mowing device is operational by manipulation of the switch engaging means.

2. The grass trimmer wheeled carrier of claim 1, wherein said support frame comprises a main support frame having a ground engaging front wheel, said front wheel being pivotable to permit turning of said support frame, and a rear support frame having a pair of ground engaging rear wheels, said rear support frame being coupled to said main support frame.

3. The grass trimmer wheeled carrier of claim 2, further comprising a pair of support braces, said support braces being coupled to said rear support frame, said support braces further being coupled to said main support frame, said support braces being for helping to maintain the position of said rear support frame in relation to said main support frame.

4. The grass trimmer wheeled carrier of claim 1, wherein said first mounting member is for holding the rotating head of the grass trimmer device in a fixed position in relation to said support frame.

5. The grass trimmer wheeled carrier of claim 1, wherein said first mounting member is adapted for positioning the rotating head of the grass trimmer device adjacent the surface of the ground.

6. The grass trimmer wheeled carrier of claim 1, wherein said switch engaging means includes a trigger member, said trigger member being pivotally mounted on said handle member, said trigger member being for attachment to the switch means of the grass trimmer device to allow the user to engage the switch means to selectively rotate the rotating head of a grass trimmer device mounted on said grass trimmer wheeled carrier.

7. A grass trimmer wheeled carrier and grass trimmer device comprising, in combination:

a grass trimmer device having an elongated shaft with a grass cutting head including a rotating head at one end and having a power means for rotating said rotating head, said power means having a switch means for selectively rotating said rotating head such that said grass trimmer device is also operational independent of the grass trimmer wheeled carrier, a main support frame having a front end and a ground engaging front wheel, said front wheel being pivotable to permit turning of said main support frame;

a rear support frame having a pair of ground engaging rear wheels, said rear support frame being coupled to said main support frame;

a first support brace being coupled to said rear support frame and being coupled to said main support frame, said first support brace being for helping to maintain the position of said rear support frame in relation to said main support frame;

a second support brace being coupled to said rear support frame and being coupled to said main support frame, said second support brace being for helping to maintain the position of said rear support frame in relation to said main support frame;

a handle member being coupled to said main support frame, said handle member being for allowing a user to maneuver the rotating head of the grass trimmer device over the ground;

a first mounting member being coupled to said main support frame and being coupled to said handle member, said first mounting member being for attachment to the grass trimmer device, said first mounting member being for holding the rotating head of the grass trimmer device in a fixed position in relation to said front end of said main support frame, said first mounting member being for positioning the rotating head of the grass trimmer device adjacent the surface of the ground;

a second mounting member being spaced apart from said first mounting member, said second mounting member being coupled to said main support frame and being coupled to said handle member, said second mounting member being for attachment to the grass trimmer device, said second mounting member mounting to said elongated shaft at a location spaced from the mounting of said first mounting member to said elongated shaft to provide a stable mounting of said elongated shaft; and a trigger member being pivotally mounted on said handle member, said trigger member being for attachment to the switch means of said grass trimmer device to allow a user to engage the switch means to selectively rotate the rotating head of said grass trimmer device mounted on said grass trimmer wheeled carrier.

* * * * *